Patented Mar. 10, 1942

2,275,639

UNITED STATES PATENT OFFICE 2,275,639

GLYCERIN FERMENTATION PROCESS

Nathan M. Mnookin, Kansas City, Mo., assignor to Speas Development Co., a corporation of Missouri No Drawing. Application February 1, 1940, Serial No. 316,761

9 Claims. (Cl. 195—38)

This invention relates to improvements in methods of fermenting fermentable materials, particularly molasses in the presence of alkaline salts to produce glycerin.

In accordance with my invention, a fermentable mash, for example, a mash comprising molasses, sodium sulfite, yeast and water is fermented to completion. The fermented mash is distilled under vacuum at comparatively low temperatures until the alcohol and very little or none of the aldehydes formed during fermentation are removed. Fresh molasses, free from added alkaline salts, and sufficient water to make up the original volume are added to the concentrated fermented mash and the mixture is re-fermented to completion. This procedure may be repeated over as many cycles as desired up to the time when the concentration of the natural salts of the added molasses inhibits further fermentation.

It has been proposed hitherto to ferment a mash to produce glycerin by re-fermenting fermented mash containing fresh fermentable material, but in this process the fermented mash, preliminary to the addition of the fresh fermentable material, was subjected to an atmospheric distillation until the volatile constituents, including alcohol and all of the acetaldehyde formed during fermentation, were removed. In this process, the temperatures employed were above about 175° F. and up to about 212° F., since it was supposed that these higher temperatures were essential to drive off the alcohol and, in particular, the acetaldehyde, which was presumed to be chemically combined with the sulfite as an aldehyde-sulfite complex, in order to make the sulfite available for re-fermentation of the fresh fermentable material. These relatively high temperatures appear to promote a reaction between the sulfite and the glycerin which deleteriously affects the glycerin and consequently impairs both the yield and purity of the glycerin removed from the final concentrated fermented mash.

By carrying out the distillations under vacuum and at low temperatures in accordance with my invention, the above and other disadvantages of the prior art processes are overcome and I am enabled to obtain from the final concentrated fermented mash a much higher yield of glycerin than heretofore, of a purity suitable even for such technical uses as in the manufacture of explosives. In comparative tests conducted in accordance with prior art methods and in accordance with the methods of the present invention, I obtained from the final concentrated fermented mashes in the latter instances, glycerin yields exceeding by more than 12 to 15% and, in many instances, by more than 20% the yields obtained from fermented mashes prepared by the prior art methods. In addition, the glycerin obtained by my methods was considerably purer than the glycerin obtained by the prior art methods.

In general, in accordance with my invention, the fermented mashes are distilled under vacuum at comparatively low temperatures, say up to about 140° to about 150° F. and slightly higher. Temperatures considerably above these limits, say, in the order of about the boiling point of alcohol, should be avoided since they tend to promote undesirable reactions between the sulfite and glycerin, thereby effecting the glycerin and ultimately reducing the yield obtainable from the fermented mashes as well as impairing the quality of the resulting glycerin. It is preferred that the distillations be carried out under such vacuum that the temperature of the fermented mash undergoing distillation does not exceed about 130° F. and is preferably about 80° to about 85° F. and even lower. A vacuum of, say, about 25 inches to 29 inches of mercury has been found suitable.

By operating within the preferred temperature range in accordance with my invention, substantially only the alcohol in the fermented mash is distilled off, since the distillate contains no appreciable quantities of aldehydes. The residue, accordingly, contains substantially all of the aldehydes developed during fermentation. In re-fermenting this alcohol-free residue with fresh fermentable material and sufficient water to make up the original volume, it is found that the re-fermentation results in the production of a high quality glycerin. In contradistinction to the prior art, therefore, it appears that alcohol and not acetaldehyde inhibits glycerin re-fermentation and that the retention of the acetaldehyde in the fermented mashes in accordance with my invention appears to improve the ultimate glycerin yield.

The following example is illustrative of the method of fermenting a fermentable material to glycerin in accordance with my invention. It is, of course, to be understood that my invention is not to be construed as limited to the specific details of the method therein set forth since these details may be varied without departing from the principle of my invention or the scope of the appended claims. In this example, which is illustrative of a preferred embodiment of my invention, glycerin is produced by fermenting and re-fermenting blackstrap molasses without the addition of fresh salts to the fermented mash. Obviously, of course, my invention may be carried out with other carbohydrate fermentable materials such as sugar and the like.

*Example*

About 468 parts by weight of blackstrap molasses in about 1666 parts by weight of water, to which has been added about 240 parts by weight of anhydrous sodium sulfite, are yeasted with about 10 parts by weight of commercial yeast and fermented to completion. The fermented mash is distilled under vacuum at a temperature in the order of about 80° F. to about 85° F. until the alcohol formed during fermentation is distilled off, and about 468 parts of fresh blackstrap molasses and sufficient water to make up the original volume are added to the alcohol-free residue. The mixture is then re-fermented to completion. This second fermented mash is vacuum distilled as described above and the procedure is repeated over two additional cycles, at which time a substantially alcohol-free residue is obtained having a relatively high percentage of glycerin.

The glycerin may be removed from the residue in any desirable manner, as for example, with solvents in accordance with the methods of my prior application Serial No. 192,397, filed February 26, 1938. I prefer, however, to extract the glycerin and treat the extract in accordance with the methods of my application, "Process of recovering and purifying glycerin," Serial No. 316,046 filed January 27, 1940, since I am thereby enabled to obtain substantially all of the glycerin present in the residue in a pure form suitable for any normal use as well as such special uses as in the manufacture of explosives.

I claim:

1. In the method of fermenting a fermentable carbohydrate mash containing alkaline salts to glycerin, the steps comprising fermenting the mash, subjecting the fermented mash to vacuum distillation at temperatures substantially below the boiling point of alcohol to distill off the alcohol formed during fermentation, adding fresh fermentable material to the residue and re-fermenting it.

2. In the method of fermenting a fermentable carbohydrate mash containing alkaline salts to glycerin, the steps comprising fermenting the mash, subjecting the fermented mash to vacuum distillation at temperatures substantially below the boiling point of alcohol to distill off the alcohol without distilling off any substantial amounts of the acetaldehyde formed during the fermentation, adding fresh fermentable material to the residue and re-fermenting it.

3. In the method of fermenting a fermentable carbohydrate mash containing alkaline salts to glycerin, the steps comprising fermenting the mash, subjecting the fermented mash to vacuum distillation at temperatures substantially below the boiling point of alcohol to distill off the alcohol formed during fermentation, adding fresh fermentable material free from added alkaline salts to the residue and re-fermenting it.

4. In the method of fermenting a fermentable carbohydrate mash containing alkaline salts to glycerin, the steps comprising fermenting the mash, subjecting the fermented mash to vacuum distillation at temperatures not in excess of about 150° F. to distill off the alcohol formed during fermentation, adding fresh fermentable material to the residue and re-fermenting it.

5. In the method of fermenting a fermentable carbohydrate mash containing alkaline salts to glycerin, the steps comprising fermenting the mash, subjecting the fermented mash to vacuum distillation at temperatures in the order of about 80° F. to about 85° F. to distill off the alcohol formed during fermentation, adding fresh fermentable material to the residue and re-fermenting it.

6. In the method of fermenting a mash including blackstrap molasses and sodium sulfite to glycerin, the steps comprising fermenting the mash, subjecting the fermented mash to vacuum distillation at temperatures not in excess of about 130° F. to distill off the alcohol formed during fermentation, adding fresh blackstrap molasses to the residue and refermenting it.

7. In the method of fermenting a fermentable mash including blackstrap molasses and sodium sulfite to glycerin, the steps comprising fermenting the mash, subjecting the fermented mash to vacuum distillation at temperatures in the order of about 80° to about 85° F. to distill off the alcohol formed during fermentation, adding fresh blackstrap molasses to the residue and re-fermenting it.

8. In the method of fermenting a mash including blackstrap molasses and sodium sulfite to glycerin, the steps comprising fermenting the mash, subjecting the fermented mash to vacuum distillation at temperatures in the order of about 80° to about 85° F. to distill off the alcohol formed during fermentation, adding fresh blackstrap molasses free from added sulfite to the alcohol-free residue and re-fermenting it.

9. The cyclic method of fermenting a mash including blackstrap molasses and sodium sulfite to glycerin, comprising fermenting the mash, subjecting the fermented mash to vacuum distillation at temperatures in the order of about 80° to about 85° F. to distill off the alcohol formed during fermentation, adding fresh blackstrap molasses free from added sulfite to the residue, re-fermenting it and repeating the cycles up to the time when the concentration of the natural salts of the added molasses inhibits further fermentation.

NATHAN M. MNOOKIN.